Feb. 4, 1947.　　　　S. E. RICHESON　　　　2,415,307
COFFEE ROASTING MACHINE COMPRISING ROASTING AND COOLING DRUMS
Filed Dec. 10, 1943　　　2 Sheets-Sheet 1

SANFORD E. RICHESON
INVENTOR

ATTORNEY

Feb. 4, 1947. S. E. RICHESON 2,415,307
COFFEE ROASTING MACHINE COMPRISING ROASTING AND COOLING DRUMS
Filed Dec. 10, 1943 2 Sheets-Sheet 2

SANFORD E. RICHESON
INVENTOR

BY John P. Nilson
ATTORNEY

Patented Feb. 4, 1947

2,415,307

UNITED STATES PATENT OFFICE 2,415,307

COFFEE ROASTING MACHINE COMPRISING ROASTING AND COOLING DRUMS

Sanford E. Richeson, Brooklyn, N. Y.

Application December 10, 1943, Serial No. 513,689

5 Claims. (Cl. 34—63)

My invention relates to coffee roasting machines and has particular reference to electrically operated machines with automatic cooling attachments.

The subject matter of this application relates to the subject matter of Patent No. 2,340,345, February 1, 1944.

My invention has for its object to provide a coffee roasting machine in which green coffee is automatically roasted and automatically discharged into a rotary cooling cylinder from which the cooled coffee is automatically discharged into a receptacle outside the machine.

I provide for this purpose an automatic rotatable feeder which at a certain time is turned into a position for admitting raw coffee into the roasting cylinder, and when roasting process is completed, for admitting the hot roasted coffee from the roasting cylinder into the rotary cooler, in which coffee is circulated around, being cooled by cooling air passing through the cooling cylinder, the cooled coffee being finally discharged from the cooler.

My invention is more fully described in the accompanying specification and drawings in which.

Figure 1:
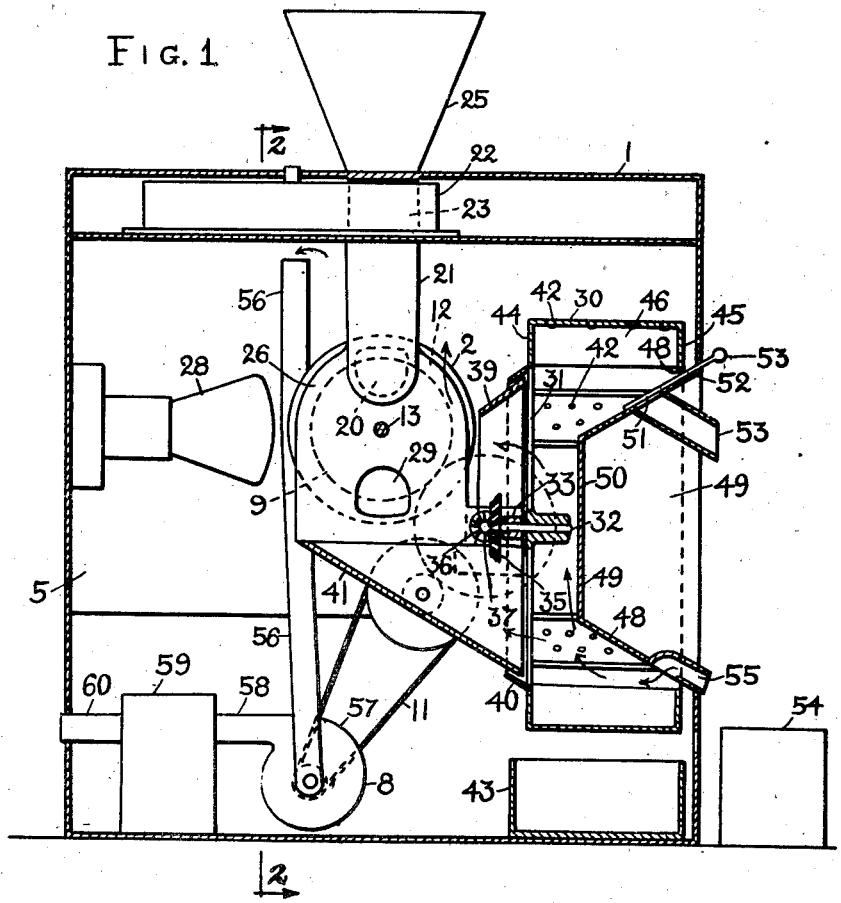
Fig. 1 is a sectional elevational view of my machine.
Figure 2:
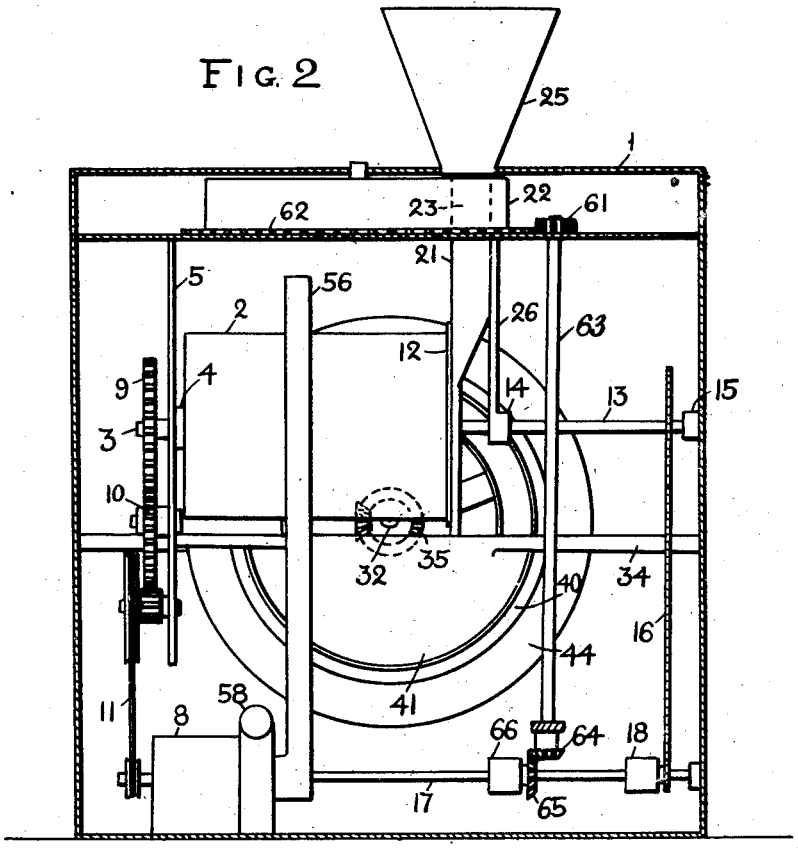
Fig. 2 is a sectional view taken on the line 2—2 of Fig. 1.

My coffee roasting machine consists of a housing 1 forming a framework for the machine, in which a roasting cylinder 2 is mounted on a shaft 3 extending from one end and journaled in a bearing 4, supported on a bracket 5. The cylinder 2 is rotated by an electric motor 8 through gears 9, 10, and belt drive 11. The outer end of the cylinder is open and covered by a disc 12, mounted on a shaft 13 supported in bearings 14, 15. The shaft 13 is connected by a belt (or other suitable) drive 16 with a motor shaft 17 through an electromagnetic clutch 18. A suitable timing mechanism, such as disclosed in my foregoing copending application, controls operation of the motor and of the clutch 18, so as to obtain the proper sequence of roasting operations, substantially as follows:

The disc 12 is at first turned with its opening 20 downward for closing a spout 21, extending from a rotary feeder 22. The feeder at the same time is turned into a position in which its opening 23 is placed under a hopper 25 with green coffee beans for filling the spout 21. The feeder is then turned for closing the hopper 25, and the disc 12 is turned to bring the opening 20 opposite the spout 21. The beans then are discharged into the roasting cylinder from the spout through the opening 20. The roasting cylinder continues to rotate, being heated by an electric heater 28, preferably of a radiating type such as a heat lamp.

Upon completion of the roasting operation, the disc 12 is turned downward, with its opening 20 opposite an opening 29 in the stationary shield 26, thereby releasing the coffee from the roasting cylinder into a cooling cylinder or container 30.

The cooling cylinder is supported on a spider 31 at one side, the spider being mounted on a shaft 32 journaled in a bearing 33 on a bracket 34, extending from the walls of the housing 1. The shaft 32 is rotated through gears 35, 36 on a shaft 37, rotated by the motor 8. The shaft 37 is also journaled in suitable bearings on the bracket 34, which also supports a frusto-conical shield 39, extending under a flange 40 on the cooling cylinder. A hopper or spout 41 extends from the shield 39 under the end of the roasting cylinder for receiving the discharged roasted coffee and delivering the same into the cooling container.

The cooling cylinder represents an annular chamber under a peripheral wall with perforations 42, sufficiently large to let the chaff from the coffee fall into a pan 43 on the floor of the housing, but not large enough for the coffee beans to fall through. The chamber is enclosed at the ends by annular walls 44, 45. Transverse radial baffles or fins 46 are supported between the walls for carrying the coffee beans around with the cylinder.

The wall 45 is separated by a narrow gap 48 from a frusto-conical recessed wall 49 in the outer wall of the housing, the recess being closed inside by a wall 50. The wall 49 has an opening 51 at the top, normally closed by a slide 52 with a handle 53 outside the housing 1. A chute or spout 53 extends from the opening 51 for discharging the cooled coffee falling from the rotating cooling cylinder, into a container 54, placed under the spout 53.

Air for cooling the roasted beans is admitted through a vent pipe 55 into the cooling cylinder and flows to the top of the housing 1 as shown by the arrows, from which it is drawn by a pipe 56 from an exhaust fan 57, connected with the motor 8. The air is washed and the smoke absorbed in a filter 59, and discharged through a pipe 60 to the outside.

Green coffee is admitted periodically into the roasting cylinder and periodically discharged in measured batches, under control of a thermostatic and timing mechanism, as described in my copending application. The size of the cooling cylinder and speed of its rotation is so proportioned in relation to the amount of coffee in one charge, that the charge is cooled, free from the chaff, and completely discharged into an outside container before the next charge of roasted coffee is admitted into the cylinder. The feeder 22 may be rotated by a pinion 61, engaging gear 62, the pinion being mounted on a shaft 63 driven by gear 64, 65 from a magnetic clutch 66 on the motor shaft 17.

Figure 3:
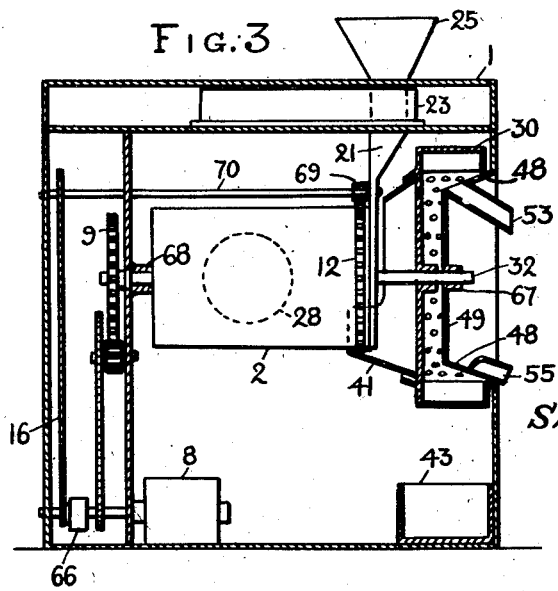
Fig. 3 is a sectional elevational view of a modified machine.

A modified machine is shown in Fig. 3. The cooling cylinder 30 is mounted directly on the shaft 32 which also mounts the roasting cylinder 2 and is supported in bearings 67, 68. The distributing disc 12 is operated by a pinion 69 on a shaft 70, driven through a transmission 16 and a magnetic clutch 66 by the motor 8. Such a design is used for simpler and less expensive machines.

It is understood that my coffee roasting machines may be further modified without departing from the spirit of the invention.

I claim as my invention:

1. A coffee roasting machine comprising a housing; a hollow roasting cylinder in the housing; means to admit raw coffee into the cylinder; means to roast the coffee in the cylinder; a cooling cylinder open at both ends; a spider supporting the rear portion of the cooling cylinder; a shaft for the spider rotatively supported in the housing; means to rotate the shaft with the cooling cylinder; means to admit roasted coffee from the roasting cylinder into the cooling cylinder; a frusto-conical recessed portion of the outer wall of the housing extending into the front portion of the cooling cylinder; a spout extending outwards from the upper portion of the frusto-conical portion of the housing wall; fins on the inside of the cooling cylinder for carrying the coffee beans upwards for discharging the same through the spout in the frusto-conical portion of the housing wall; and means to circulate outside air through the cooling cylinder for cooling the coffee.

2. A coffee roasting machine comprising a housing; a hollow roasting cylinder in the housing; means to admit raw coffee into the cylinder; means to roast the coffee in the cylinder; a cooling cylinder having a large central opening in the front outer wall and a spider connected to the inner rear portion of the cooling cylinder; a shaft supported centrally in the spider; means to rotate the shaft with the spider and cooling cylinder; means to admit roasted coffee from the roasting cylinder into the cooling cylinder; a frusto-conical recessed portion of the outer wall of the housing extending into the cooling cylinder through the central opening therein with a small annular clearance; the upper portion of the frusto-conical recessed portion having a discharge opening; a spout extending downwards and outward from the recessed portion for delivering the cooled coffee to the outside of the housing; fins on the inner side of the cooling cylinder for raising the coffee beans upward towards the discharge opening; and means to circulate outside air through the cooling cylinder for cooling the coffee.

3. In a coffee roasting machine having a housing, a hollow roasting cylinder in the housing, means to admit raw coffee into the cylinder and means to roast the coffee in the cylinder; in combination, a cooling cylinder having a large central opening in the front outer wall; a spider supporting the inner rear portion of the cooling cylinder; a shaft secured to the spider; means to rotate the shaft with the spider and the cooling cylinder; means to admit roasted coffee from the roasting cylinder into the cooling cylinder; a frusto-conical recessed portion of the outer wall of the housing extending into the cooling cylinder through the center opening therein with a small annular clearance; the upper portion of the frusto-conical recessed portion having a discharge opening for the cooled coffee; a spout extending downwards and outwards from the opening for delivery of the cooled coffee to the outside of the housing; fins on the inner side of the cooling cylinder for raising the coffee beans upward towards the discharge opening; and means to admit outside air into the cooling cylinder, the peripheral wall of the cooling cylinder being provided with small openings for exhausting the air and for discharging chaff from the roasted coffee beans.

4. A coffee roasting machine comprising a housing; a hollow roasting cylinder in the housing; means to admit raw coffee into the cylinder; means to roast the coffee in the cylinder; a cooling cylinder having a large central opening in the front outer wall and large openings in the inner rear wall forming a spider; a shaft supporting the spider; means to rotate the shaft with the cooling cylinder; means to admit roasted coffee from the roasting cylinder into the cooling cylinder; a frusto-conical recessed portion of the outer wall of the housing extending into the cooling cylinder through the outer opening therein with a small annular clearance; the upper portion of the frusto-conical recessed portion having a discharge opening; a spout extending downwards and outwards from the opening for delivering the cooled coffee to the outside of the housing; fins on the inner side of the cooling cylinder for raising the coffee beans upward towards the discharge opening; means to close the opening in the frusto-conical portion; and means to circulate outside air through the cooling cylinder for cooling the coffee.

5. A coffee roasting machine having a housing; a hollow roasting cylinder in the housing, means to admit raw coffee into the cylinder, and means to roast the coffee in the cylinder; in combination, a cooling cylinder having a large central opening in the front outer wall and a spider in the rear; a shaft secured to the spider; means to rotate the shaft with the spider and cooling cylinder; a frusto-conical recessed portion of the outer wall of the housing extending into the cooling cylinder through the front outer opening; an inward extending conical flange on the cooling cylinder; a conical shield supported in the housing extending into the flange of the cooling cylinder; the shield extending under the discharge end of the roasting cylinder for receiving the roasted coffee and for delivering the same into the cooling cylinder; the frusto-conical portion having an opening in the upper portion; a spout extending from the opening to the outside and downwards; fins on the inside of the cooling cylinder for carrying the coffee beans upwards and delivering them to the opening in the frusto-conical portion; means to admit outside air into the cooling cylinder for cooling the coffee; and means to exhaust air from the cooling cylinder.

SANFORD E. RICHESON.

REFERENCES CITED

The following references are of record in the file of this patent:

UNITED STATES PATENTS

| Number | Name | Date |
|---|---|---|
| 1,677,651 | Noonan | July 17, 1928 |
| 1,510,307 | Christie | Sept. 30, 1924 |
| 2,340,345 | Richeson | Feb. 1, 1944 |
| 196,274 | Underwood | Oct. 16, 1877 |
| 387,158 | Freygang | July 31, 1888 |

FOREIGN PATENTS

| Number | Country | Date |
|---|---|---|
| 417,015 | German | Aug. 5, 1925 |
| 363,445 | German | Nov. 9, 1922 |